(12) United States Patent
Visconti

(10) Patent No.: US 8,973,934 B1
(45) Date of Patent: Mar. 10, 2015

(54) PROPULSION SYSTEM

(71) Applicant: Pier Paolo Visconti, Miami Beach, FL (US)

(72) Inventor: Pier Paolo Visconti, Miami Beach, FL (US)

(73) Assignee: SOBE Stroller LLC, Miami Beach, FL (US)

(*) Notice: Subject to any disclaimer, the term of this patent is extended or adjusted under 35 U.S.C. 154(b) by 0 days.

(21) Appl. No.: 14/183,683

(22) Filed: Feb. 19, 2014

(51) Int. Cl.
*B62B 5/00* (2006.01)
(52) U.S. Cl.
CPC .................... *B62B 5/0026* (2013.01)
USPC ........................................................ 280/210
(58) Field of Classification Search
CPC ..................................................... B62B 5/0026
USPC ................................. 280/47.38, 204, 210, 221
See application file for complete search history.

(56) References Cited

U.S. PATENT DOCUMENTS 6,722,689 B2 * 4/2004 Kreamer ................. 280/642
8,322,740 B1 * 12/2012 Visconti ................. 280/221

* cited by examiner

*Primary Examiner* — Joseph Rocca
*Assistant Examiner* — Felicia L Brittman
(74) *Attorney, Agent, or Firm* — Albert Bordas, P.A.

(57) ABSTRACT

An elliptical propulsion system for stroller assemblies. The elliptical propulsion system has a propulsion frame assembly, a propulsion assembly, and a propulsion wheel assembly. The propulsion frame assembly is removably mounted onto a stroller assembly. Further having elliptical motion means to cause propulsion wheel assembly to rotate and propel the stroller assembly when the propulsion frame assembly, propulsion assembly, and propulsion wheel assembly are in an extended configuration.

17 Claims, 9 Drawing Sheets

PROPULSION SYSTEM

BACKGROUND OF THE INVENTION

1. Field of the Invention

The present invention relates to propulsion systems, and more particularly, to elliptical propulsion systems for stroller assemblies.

2. Description of the Related Art

Applicant believes that the closest reference corresponds to Applicant's own U.S. Pat. No. 8,322,740 B1 issued on Dec. 4, 2012 for Elliptical Stroller Assembly. However, it differs from the present invention because Applicant's U.S. Pat. No. 8,322,740 B1 teaches an elliptical stroller assembly including a stroller frame assembly with a stroller assembly mounted thereto, first and second wheel assemblies, a propulsion frame assembly and a propulsion assembly. The propulsion frame assembly and the propulsion assembly may be in an extended or in a retracted configuration with respect to the stroller frame assembly and the stroller assembly. In the extended configuration, the propulsion assembly propels the stroller frame assembly and the propulsion frame assembly is removably secured to a first fixed mount. In the retracted configuration, the propulsion assembly does not propel the stroller frame assembly. At this position, the propulsion frame assembly is removably secured to a second fixed mount.

Other patents describing the closest subject matter provide for a number of more or less complicated features that fail to solve the problem in an efficient and economical way. None of these patents suggest the novel features of the present invention.

SUMMARY OF THE INVENTION

The present invention is an elliptical propulsion system for stroller assemblies. More specifically, the present invention is an elliptical propulsion system, comprising a propulsion frame assembly, a propulsion assembly, and a propulsion wheel assembly. The propulsion frame assembly is removably mounted onto a stroller assembly. Further comprising elliptical motion means to cause propulsion wheel assembly to rotate and propel the stroller assembly when the propulsion frame assembly, propulsion assembly, and propulsion wheel assembly are in an extended configuration.

The stroller assembly comprises an axle mount sleeve assembly. The axle mount sleeve assembly comprises an axle mount sleeve having a mounting shaft with a threaded section. The propulsion frame assembly comprises a mounting frame member. The mounting frame member removably mounts onto the mounting shaft. The mounting frame member comprises a mounting nut that securely tightens onto the threaded section. The axle mount sleeve assembly is mounted onto a rear wheel assembly of the stroller assembly.

The propulsion frame assembly comprises a supporting frame member having first and second fixed axles extending therefrom. The propulsion frame assembly further comprises a fork assembly having first and second ends. The propulsion wheel assembly comprises at least one wheel that is mounted onto the fork assembly. The fork assembly extends to each side of the propulsion wheel assembly. The fork assembly comprises ends that mount onto a wheel gear axle.

The propulsion wheel assembly comprises a locking ring. The stroller assembly comprises a locking pin assembly. The locking pin assembly comprises a housing containing a locking pin. The locking pin secures the locking ring when the propulsion frame assembly, the propulsion assembly, and the propulsion wheel assembly are in a retracted configuration.

The stroller assembly comprises hingedly mounted handles to permit the handles to be in an extended or retracted orientation. The axle mount sleeve assembly comprises stop posts to limit a turning radius of the stroller assembly.

It is therefore one of the main objects of the present invention to provide an elliptical propulsion system for stroller assemblies that is removably mounted onto stroller assemblies.

It is another object of this invention to provide an elliptical propulsion system for stroller assemblies that permits a stroller to be propelled by a propulsion assembly when a propulsion frame assembly is in an extended configuration with respect to a stroller frame assembly.

It is another object of this invention to provide an elliptical propulsion system for stroller assemblies that permits a stroller to be in a retracted configuration when the stroller is not propelled by the propulsion assembly.

It is another object of this invention to provide an elliptical propulsion system for stroller assemblies that can be used as an elliptical exercise machine while transporting a person, pet, or thing in a stroller when in the extended configuration.

It is another object of this invention to provide an elliptical propulsion system for stroller assemblies that can be used as a traditional style stroller when the propulsion frame assembly is in the retracted configuration.

It is another object of this invention to provide an elliptical propulsion system for stroller assemblies that can be used as a traditional style stroller when the propulsion frame assembly is dismounted/detached therefrom.

It is another object of this invention to provide an elliptical propulsion system for stroller assemblies that is volumetrically efficient for carrying, transporting, and storage.

It is another object of this invention to provide an elliptical propulsion system for stroller assemblies that can be readily mounted and dismounted without any special tools.

It is another object of this invention to provide an elliptical propulsion system for stroller assemblies that can be readily placed into the retracted configuration and extended configuration, and vice-versa, without any special tools.

It is another object of this invention to provide an elliptical propulsion system for stroller assemblies that is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
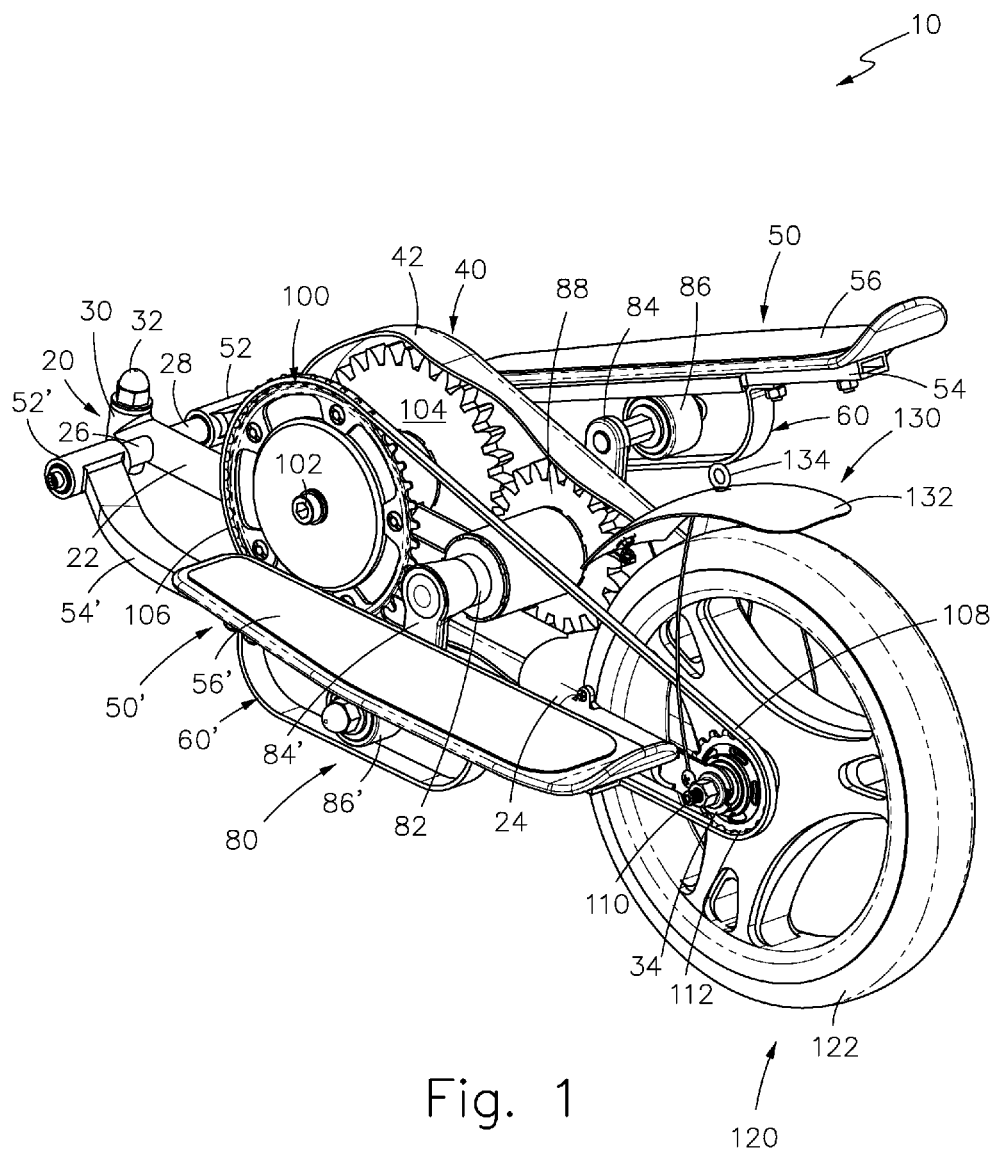
FIG. 1 represents a rear isometric view of an elliptical propulsion system.

Referring now to the drawings, the present invention is an elliptical propulsion system for stroller assemblies, and is generally referred to with numeral 10. It can be observed that it basically includes propulsion frame assembly 20, propulsion assembly 40, and propulsion wheel assembly 120.

As seen in FIG. 1, propulsion frame assembly 20 comprises supporting frame member 22. Fixed axles 26 and 28 extend transversally from supporting frame member 22. Mounting frame member 30 is fixed at a front end of supporting frame member 22. Mounting frame member 30 has mounting nut 32. Extending from a rear end of supporting frame member 22 is fork assembly 24 having ends 34.

Propulsion wheel assembly 120 comprises wheel 122 that is mounted to fork assembly 24, whereby fork assembly 24 extends to each side of propulsion wheel assembly 120 and ends 34 each mount onto wheel gear axle 110. Propulsion wheel assembly 120 further comprises fender assembly 130 having fender 132. Fender 132 has locking ring 134.

Propulsion assembly 40 has right and left pedal assemblies 50 and 50' respectively. Right and left bushings 52 and 52' are mounted to respective fixed axles 28 and 26. Propulsion assembly 40 further comprises crank assembly 80 and gear system 100. Gear cover 42 is partially cross-sectioned to show internal components. Gear cover 42 houses crank assembly 80 and gear system 100. Elongated connecting bars 54 and 54' extend from right and left bushings 52 and 52'. Pedals 56 and 56' are mounted onto connecting bars 54 and 54', respectively. Right and left pedal assemblies 50 and 50' are mechanically connected to crank assembly 80, and in turn to gear system 100. Gear system 100 is mechanically connected to propulsion wheel assembly 120.

Crank axle 82 and gear axle 102 are mounted to supporting frame member 22 at a substantially parallel and spaced apart relationship from each other. Crank assembly 80 has crank axle 82 with crank arms 84 and 84' connected at its ends. Crank arms 84 and 84' rotate upon crank axle 82. Circular pedals 86 and 86' are rotatably mounted to the distal ends of crank arms 84 and 84'. Crank sprocket 88 is also mounted to crank axle 82 between crank arm 84 and supporting frame member 22. Crank sprocket 88 cooperatively connects to gear sprocket 104 mounted to gear axle 102. Also mounted to gear axle 102 is gear sprocket 106.

Present invention 10 comprises elliptical motion means, whereby when a person applies forces with his/her feet upon propulsion assembly 40, and specifically to pedals 56 and 56' in an elliptical manner, it causes crank arms 84 and 84' to rotate. Thus, causing crank sprocket 88 to rotate and gear sprocket 104 to rotate. A rotational force is then transmitted with gear axle 102 to gear sprocket 106. Chain 108 is mounted to gear sprocket 106 and wheel gear 112. Chain 108 turns wheel gear 112, consequently causing propulsion wheel assembly 120 to rotate and therefore propelling instant invention 10.

Figure 2:
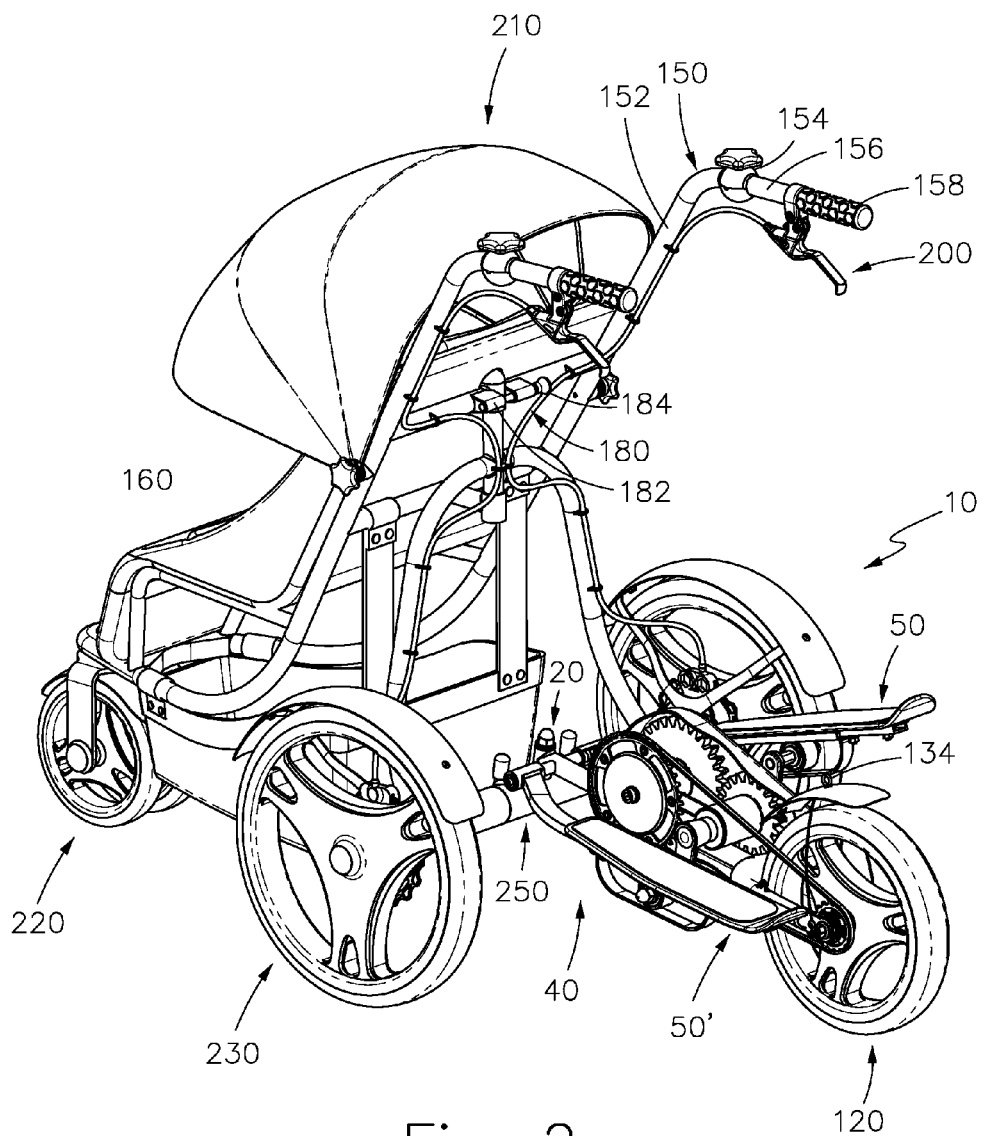
FIG. 2 represents a rear isometric view of the elliptical propulsion system in an extended configuration and mounted onto a stroller frame assembly.
Figure 3:
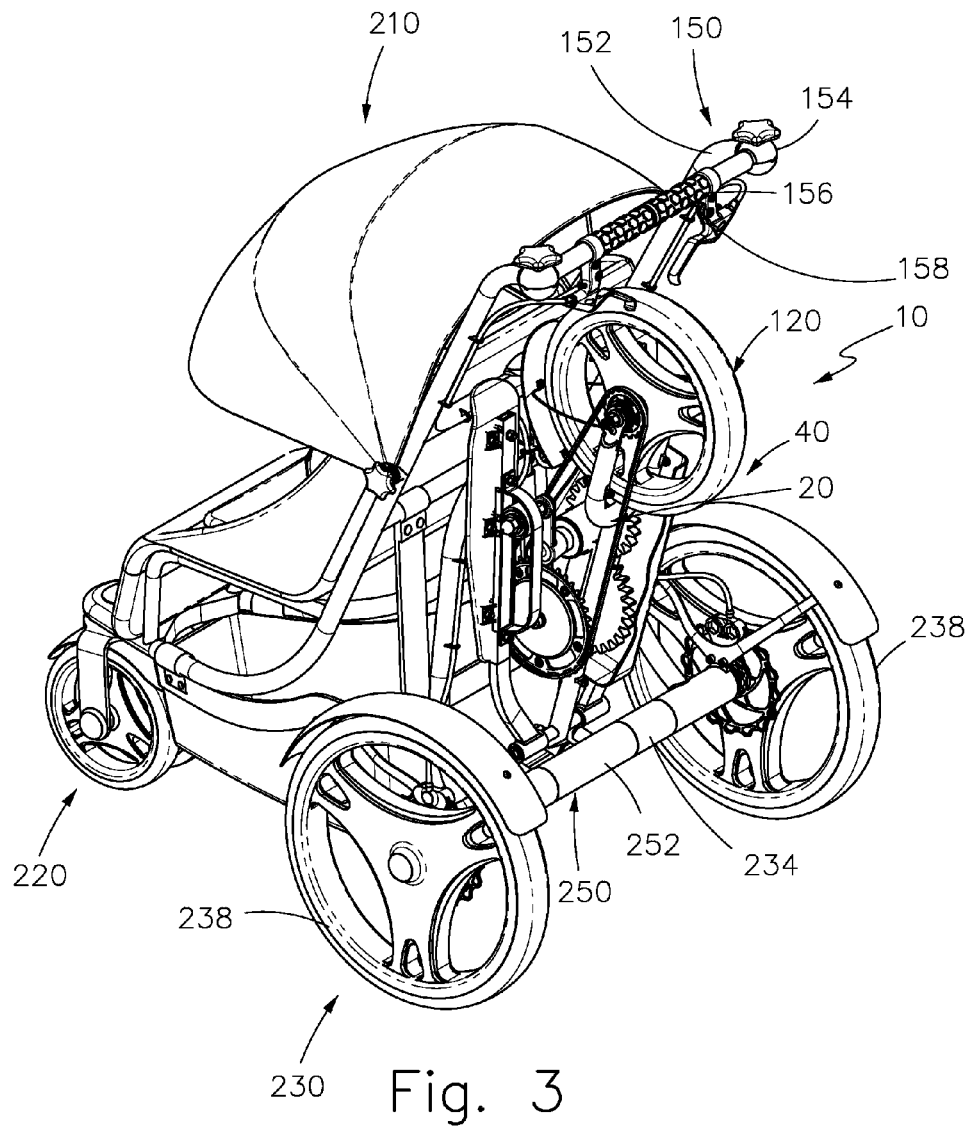
FIG. 3 represents a rear isometric view of the elliptical propulsion system in a retracted configuration and mounted onto the stroller frame assembly.

As seen in FIGS. 2 and 3, propulsion frame assembly 20 is removably mounted to stroller frame assembly 150. Stroller frame assembly 150 comprises stroller assembly 210, front and rear wheel assemblies 220 and 230 respectively, and axle mount sleeve assembly 250. Stroller frame assembly 150 comprises handlebars 152 with respective hinges 154. Handles 156 extend from handlebars 152. Handles 156 have grips 158. According to the user convenience, handles 156 may be extended, as shown in FIG. 2, or retracted as seen in FIG. 3, with the use of hinges 154.

As best seen in FIG. 2, propulsion assembly 40 is mounted to propulsion frame assembly 20. Propulsion frame assembly 20 is removably mounted to stroller frame assembly 150. Also, stroller assembly 210 is mounted to stroller frame assembly 150. As seen in this illustration, propulsion frame assembly 20 is in an extended configuration with respect to stroller frame assembly 150 and stroller assembly 210. When propulsion frame assembly 20 is mounted and secured to stroller frame assembly 150 and in the extended configuration, propulsion assembly 40 propels stroller frame assembly 150 when a person applies forces with his/her feet upon propulsion assembly 40 in an elliptical manner.

As also seen in FIG. 2, stroller frame assembly 150 further comprises steering frame mount 160, locking pin assembly 180, and brake system 200. Locking pin assembly 180 comprises housing 182 that removably receives locking pin 184. Housing 182 is mounted as a two-compartment configuration around steering frame mount 160. Brake system 200 is mounted to stroller frame assembly 150 and rear wheel assembly 230.

As seen in FIG. 3, when propulsion frame assembly 20 is in the retracted configuration, stroller frame assembly 150 is not propelled by propulsion assembly 40, but instead may be moved by a person applying a force at handles 156, and specifically at grips 158. In the retracted configuration, locking ring 134, seen in FIGS. 1 and 2, is removably received by housing 182, seen in FIG. 2, whereby locking ring 134 is secured by locking pin 184, seen in FIG. 2.

Figure 4:
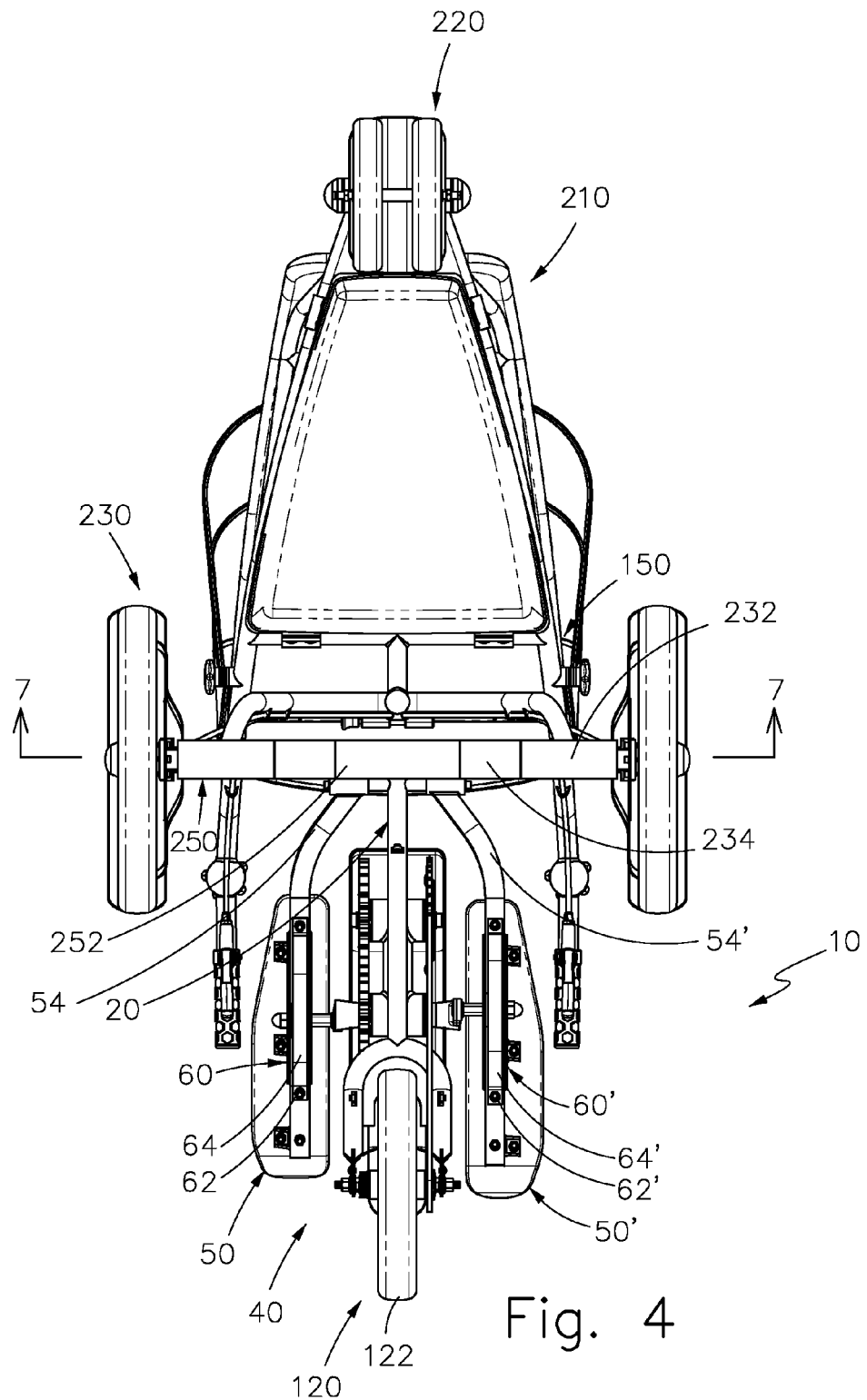
FIG. 4 is a bottom plan view of the elliptical propulsion system in the extended configuration and mounted onto the stroller frame assembly.
Figure 5:
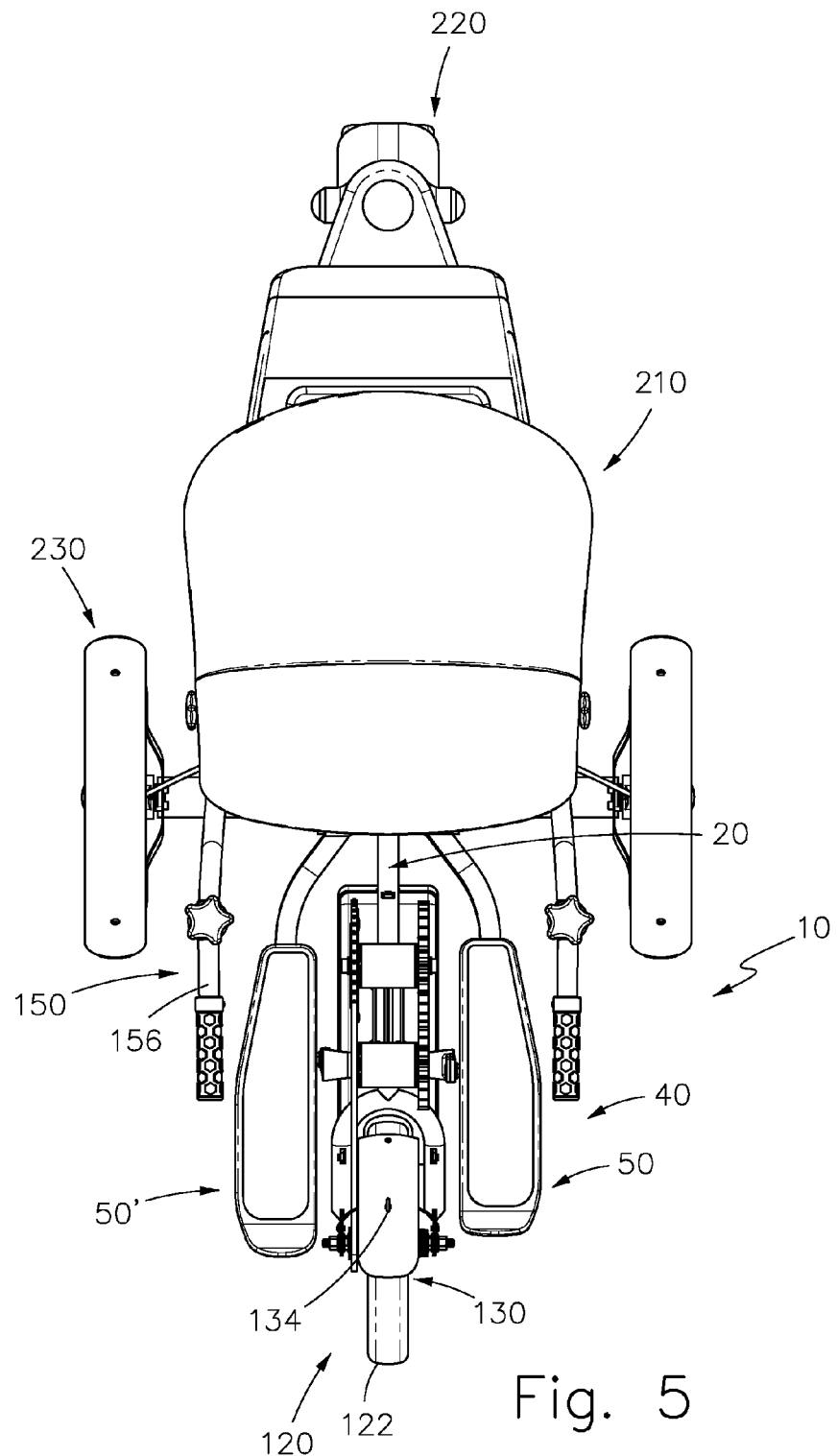
FIG. 5 is a top plan view of the elliptical propulsion system in the extended configuration and mounted onto the stroller frame assembly.
Figure 6:
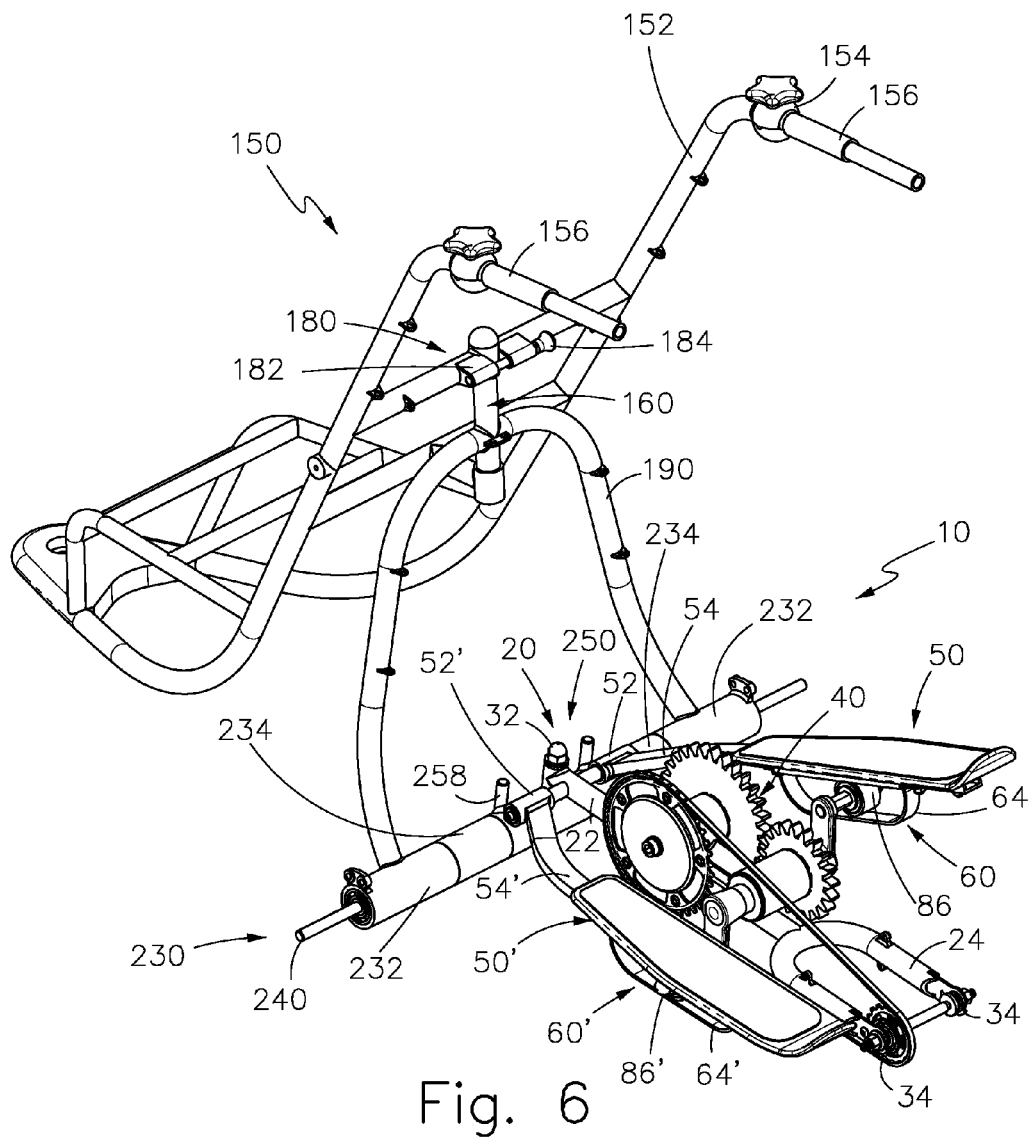
FIG. 6 is a partial isometric view of a propulsion frame assembly and a propulsion assembly mounted onto the stroller frame assembly.

As seen in FIGS. 4, 5, and 6, front wheel assembly 220 and rear wheel assembly 230 are mounted to stroller frame assembly 150.

As seen in FIGS. 4 and 6, channel assemblies 60 and 60' are mounted to an underside of elongated connecting bars 54 and 54' with respective mounting tabs 62 and 62', best seen in FIG. 4. Channel assemblies 60 and 60' comprise channel frame 64 and 64', which along with the underside of elongated connecting bars 54 and 54' define respective cavities that receive circular pedals 86 and 86' therein.

As best seen in FIG. 6, connector frame section 190 is mounted to steering frame mount 160 to allow stroller frame assembly 150 to swivel/turn. Distal ends of connector frame section 190 are mounted to rear wheel assembly 230. Rear wheel assembly 230 comprises axle spacers 232 and sleeves 234. Specifically, the distal ends of connector frame section 190 are mounted to axle spacers 232.

Figure 7:
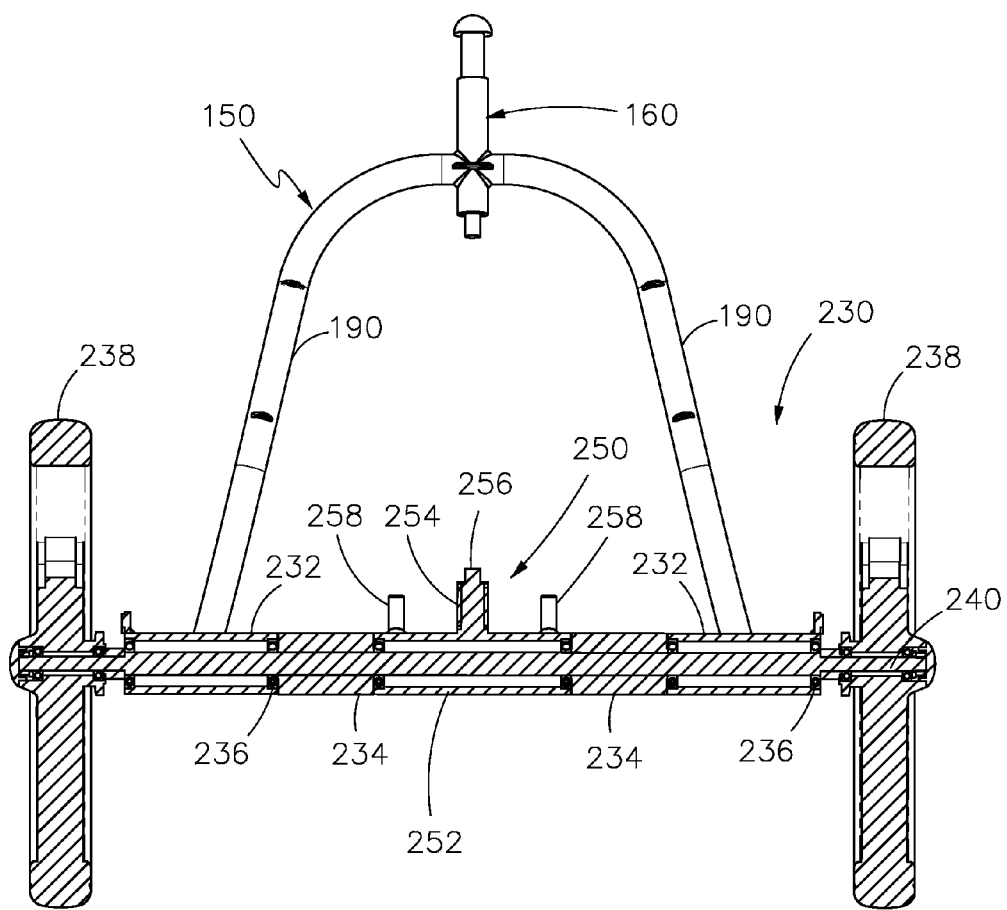
FIG. 7 is a cross section view of a rear wheel assembly taken along lines 7-7 from FIG. 4.

As seen in FIG. 7, rear wheel assembly 230 comprises rear wheels 238 and bearings 236. Rear wheels 238 are rotatably mounted to axle 240. Axle spacers 232 are also mounted to axle 240. Axle 240 protrudes from axle spacers 232. Axle spacers 232 have respective bearings 236. Sleeves 234 are also rotatably mounted onto axle 240.

Axle mount sleeve assembly 250 is also mounted to rear wheel assembly 230, specifically, between sleeves 234. Axle mount sleeve assembly 250 comprises axle mount sleeve 252 with mounting shaft 254 extending therefrom at a substantially vertical position when propulsion frame assembly 20 is in an extended configuration. Mounting shaft 254 has threaded section 256 that cooperatively receive mounting nut 32, seen in FIG. 6. Propulsion frame assembly 20 is mounted onto rear wheel assembly 230 of stroller frame assembly 150, whereby mounting frame member 30 receives mounting shaft 254 and mounting nut 32 securely tightens onto threaded section 256. When not desired, propulsion frame assembly 20 may be dismounted from rear wheel assembly 230 without affecting functionalities of stroller frame assembly 150.

Stop posts 258 also extend from axle mount sleeve 252 at a cooperative distance from mounting shaft 254. Stop posts 258 limit a turning radius, by limiting the movement of right and left bushings 52 and 52' when stroller frame assembly 150 turns/swivels.

Figure 8:
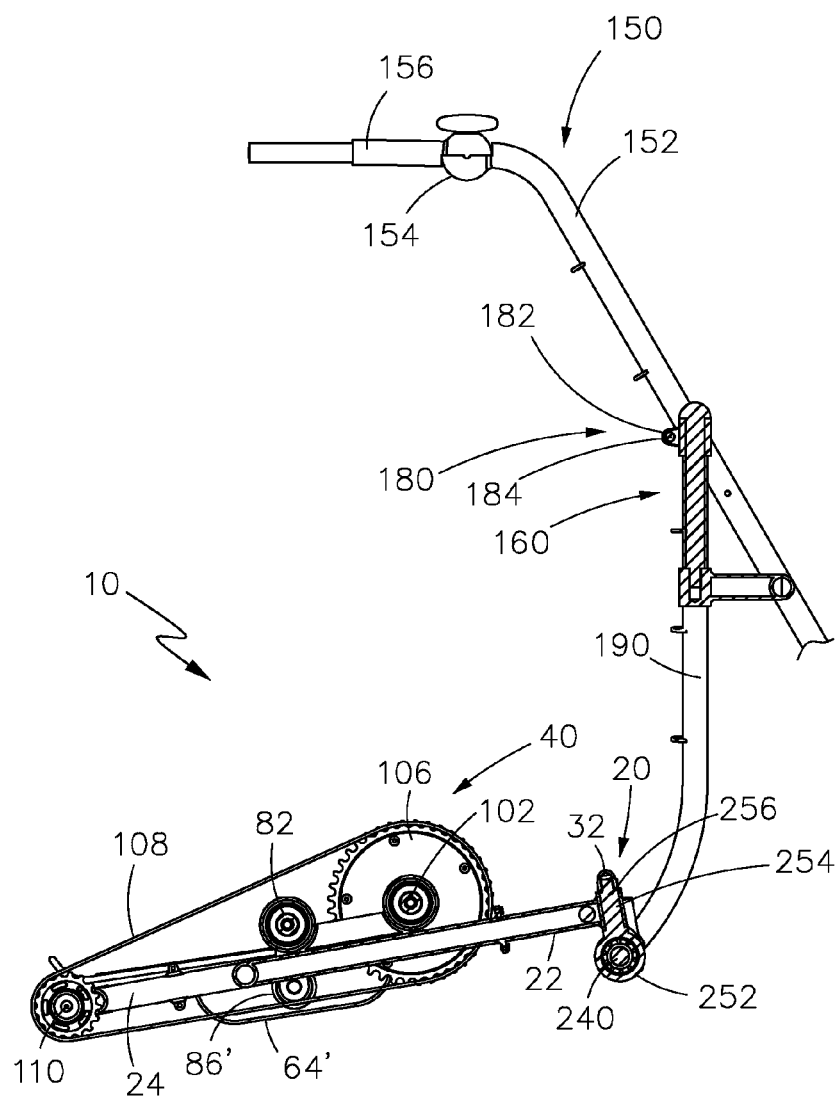
FIG. 8 is a side elevational view of the propulsion frame assembly with cross-sectioned parts when the elliptical propulsion system in the extended configuration.
Figure 9:
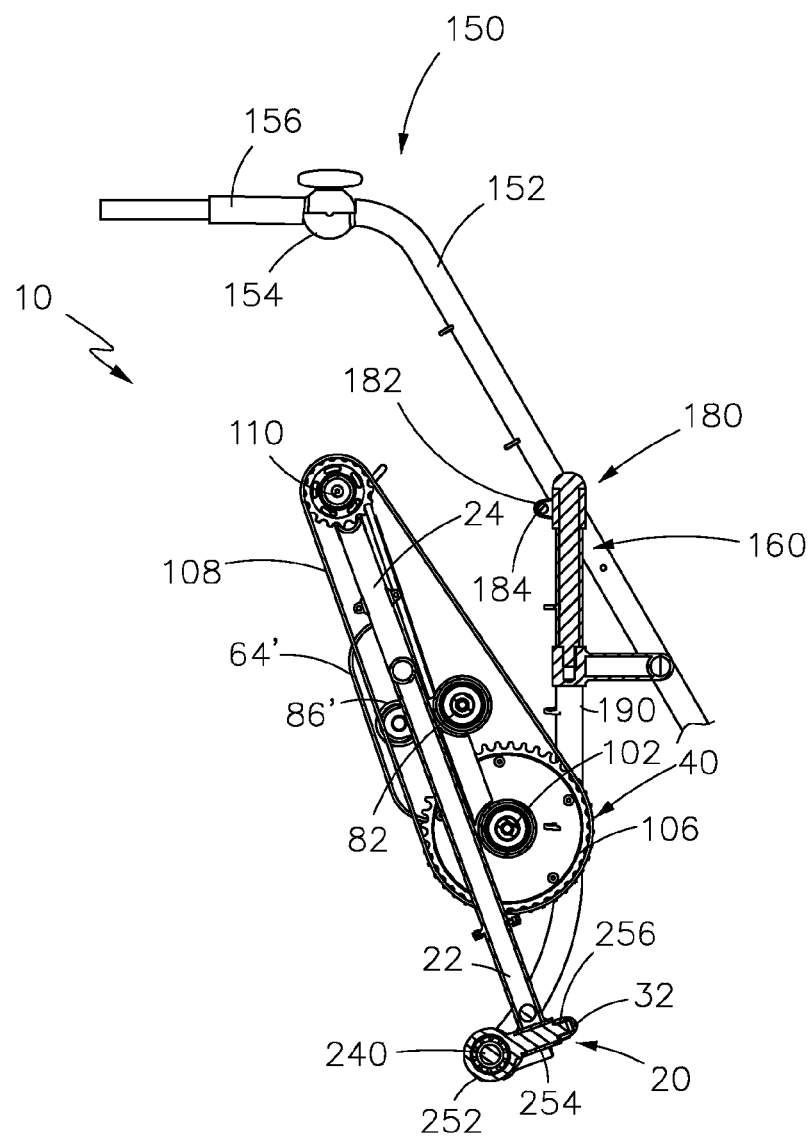
FIG. 9 is a side elevational view of the propulsion frame assembly with cross-sectioned parts when the elliptical propulsion system in the retracted configuration.

To position propulsion frame assembly 20 and propulsion assembly 40 from the extended configuration seen in FIGS. 2 and 8, into the retracted configuration seen in FIGS. 3 and 9, propulsion frame assembly 20 is oriented/elevated until it is at a substantially vertical position. Then, locking ring 134 is secured in housing 182 with locking pin 184.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An elliptical propulsion system, comprising:
    A) a propulsion frame assembly;
    B) a propulsion assembly; and
    C) a propulsion wheel assembly, said propulsion frame assembly removably mounted onto a stroller assembly, said stroller assembly comprises an axle mount sleeve assembly, said axle mount sleeve assembly comprises an axle mount sleeve having a mounting shaft with a threaded section.

2. The elliptical propulsion system set forth in claim 1, further comprising elliptical motion means to cause the propulsion wheel assembly to rotate and propel said stroller assembly.

3. The elliptical propulsion system set forth in claim 1, further comprising elliptical motion means to cause the propulsion wheel assembly to rotate and propel said stroller assembly when said propulsion frame assembly, said propulsion assembly, and said propulsion wheel assembly are in an extended configuration.

4. The elliptical propulsion system set forth in claim 1, further characterized in that said propulsion frame assembly comprises a mounting frame member.

5. The elliptical propulsion system set forth in claim 4, further characterized in that said mounting frame member removably mounts onto said mounting shaft.

6. The elliptical propulsion system set forth in claim 4, further characterized in that said mounting frame member comprises a mounting nut that securely tightens onto said threaded section.

7. The elliptical propulsion system set forth in claim 1, further characterized in that said axle mount sleeve assembly is mounted onto a rear wheel assembly of said stroller assembly.

8. The elliptical propulsion system set forth in claim 1, further characterized in that said propulsion frame assembly comprises a supporting frame member having first and second fixed axles extending therefrom, said propulsion frame assembly further comprises a fork assembly having first and second ends.

9. The elliptical propulsion system set forth in claim 8, further characterized in that said propulsion wheel assembly comprises at least one wheel that is mounted onto said fork assembly.

10. The elliptical propulsion system set forth in claim 8, further characterized in that said fork assembly extends to each side of said propulsion wheel assembly.

11. The elliptical propulsion system set forth in claim 8, further characterized in that said fork assembly comprises ends that mount onto a wheel gear axle.

12. The elliptical propulsion system set forth in claim 1, further characterized in that said propulsion wheel assembly comprises a locking ring.

13. The elliptical propulsion system set forth in claim 12, further characterized in that said stroller assembly comprises a locking pin assembly.

14. The elliptical propulsion system set forth in claim 13, further characterized in that said locking pin assembly comprises a housing containing a locking pin.

15. The elliptical propulsion system set forth in claim 14, further characterized in that said locking pin secures said locking ring when said propulsion frame assembly, said propulsion assembly, and said propulsion wheel assembly are in a retracted configuration.

16. The elliptical propulsion system set forth in claim 1, further characterized in that said stroller assembly comprises hingedly mounted handles to permit said handles to be in an extended or retracted orientation.

17. The elliptical propulsion system set forth in claim 1, further characterized in that said axle mount sleeve assembly comprises stop posts to limit a turning radius of said stroller assembly.

* * * * *